United States Patent [19]
Wasson

[11] Patent Number: 5,295,031
[45] Date of Patent: Mar. 15, 1994

[54] ROTARY POSITIONING APPARATUS

[76] Inventor: Ken G. Wasson, P.O. Box 8027, Foster City, Calif. 94404

[21] Appl. No.: 750,091

[22] Filed: Aug. 29, 1991

[51] Int. Cl.$^5$ .......................... G11B 5/55; G11B 21/08
[52] U.S. Cl. ..................... 360/106; 360/109; 360/130.22; 360/75; 360/78.12
[58] Field of Search .......... 360/106, 104, 109, 130.22, 360/75, 78.12

[56] References Cited

U.S. PATENT DOCUMENTS

| | | | |
|---|---|---|---|
| 4,620,252 | 10/1986 | Bauck et al. | 360/106 |
| 4,985,652 | 1/1991 | Oudet et al. | 360/106 |
| 5,016,131 | 5/1991 | Riggle et al. | 360/106 |
| 5,041,935 | 8/1991 | Aruga et al. | 360/106 |
| 5,119,253 | 6/1992 | Kotani | 360/106 |
| 5,161,077 | 11/1992 | Jabbari | 360/106 |
| 5,168,184 | 12/1992 | Umehara et al. | 360/106 |

OTHER PUBLICATIONS

Patent Abstracts of Japan, vol. 14, No. 255 (E-935), May 31, 1990.
JP-A-2074143 (Fujitsu, Ltd.) Mar. 14, 1990-Abstract Research Disclosure, vol. 308, No. 92, Dec. 1989.
New York US-Anonymous "Balanced and Coupled Dual Voice Coil Motor Design", whole document, IEEE transactions on Magnetics, vol. MAG-7, No. 4, Jul. 1981.
"Mechanical and Servo Design of a 10 Inch Disk Driv" by Mizoshita et al.

Primary Examiner—Paul M. Dzierzynski
Assistant Examiner—Kim-Kwok Chu
Attorney, Agent, or Firm—Mueller and Smith

[57] ABSTRACT

Rotary positioning devices are described wherein a coil and permanent magnet combination is provided to couple a torque into a pivotally mounted arm member, the pivot of which is located substantially at the center of gravity of the assemblage. By coupling such a torque into the device to cause rotational pivotal movement, forces otherwise imposed upon the pivot and bearing structure are substantially avoided. Suited particularly for a rotary head positioning assemblage utilized with disk drives, in one embodiment, the permanent magnets are mounted with the pivoting arm for movement adjacent an energized coil structure. In another embodiment, the coils are mounted upon the pivoted arm and are moved in adjacency with spaced magnet structures. The magnet structures may be configured with slots and geometric shapes selected to achieve optimized torque developing vectors exhibiting uniformity of force application throughout the extent of pivoting of the arm assemblage.

24 Claims, 8 Drawing Sheets

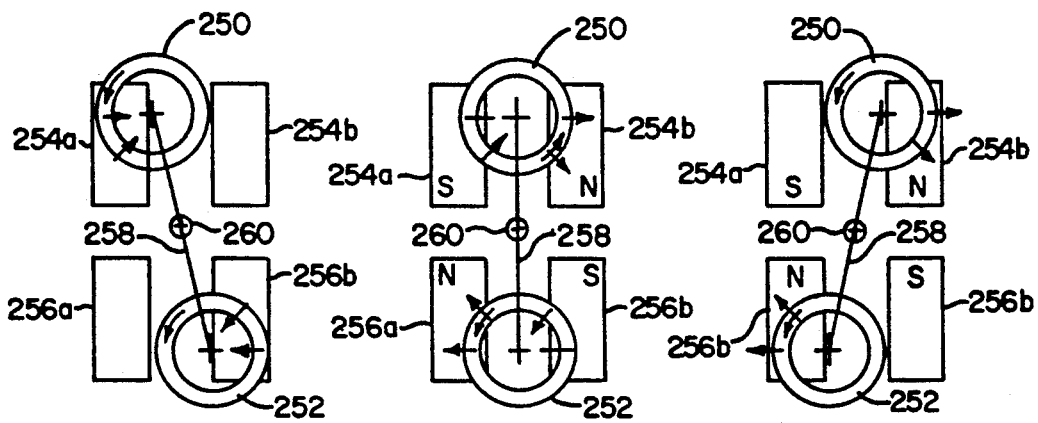
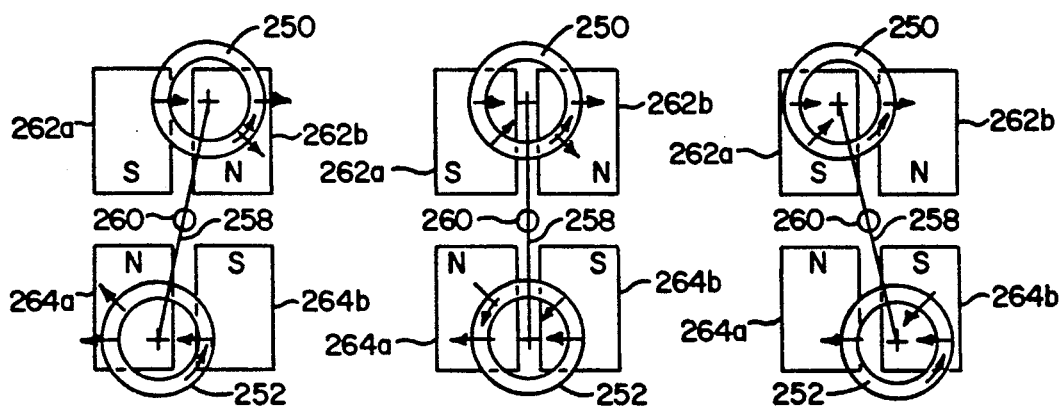
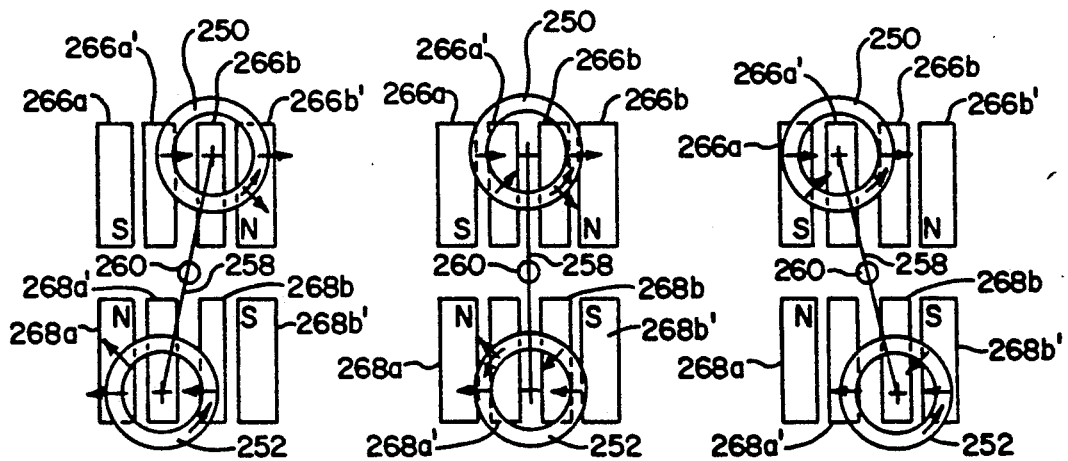

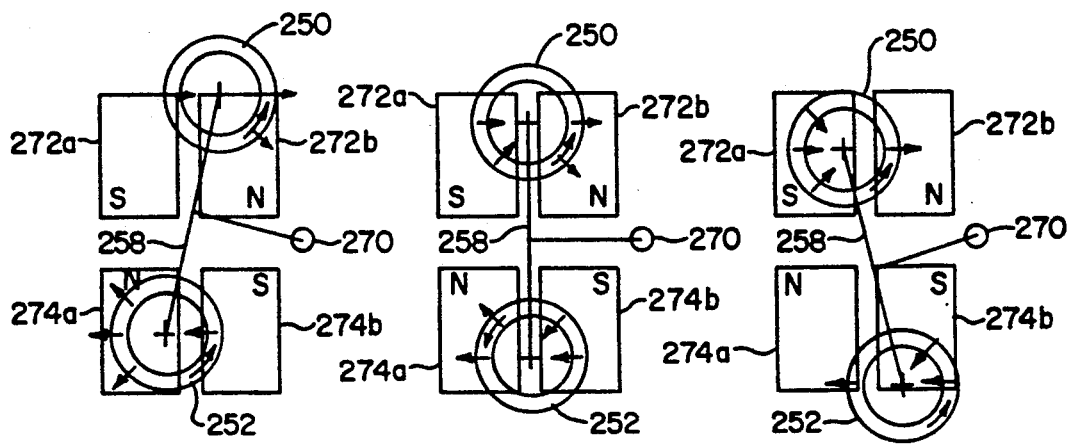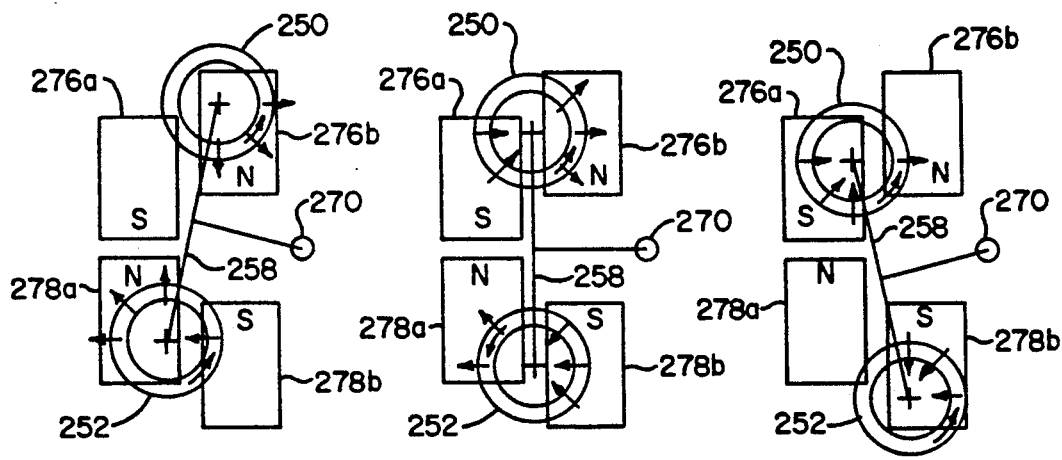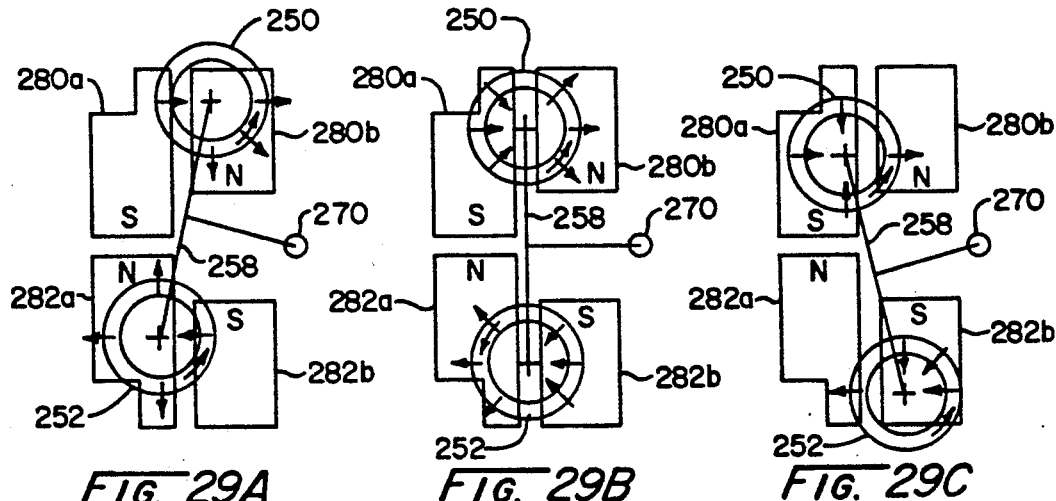

ROTARY POSITIONING APPARATUS

BACKGROUND OF THE INVENTION

Over its somewhat abbreviated history, the computer industry has developed a wide range of storage techniques for data, now generally present in bit form as a flux reversal in magnetic media. Some applications storing mass volumes of data involve equipment which is correspondingly large and accessing or retrieving the data can be at a relatively leisurely pace. Recent emphasis, however, has been to the enhancement of the data retaining and accessing capability of small computers employing hard disk drives for primary data retention. Typically, the smaller of these disks are less than a nominal 8 inch diameter. The small disks perform in conjunction with read/write heads configured as "sliders" supported by relative air velocity about 5 microinches above the magnetic media surface. Positioning of the head with respect to a given one of the concentric tracks on a disk is by a head actuator.

Head actuators traditionally have taken two general forms, linear and rotary. The linear actuator moves a head along a locus aligned with a disk radius. This movement is provided by a head support assembly mounted upon bearings and driven by the coil of an actuator configured, for example, as a voice coil assembly. Such linear devices generally perform as Faraday based systems, the coil moving under the relationship $F = Bli$ where F is force, B is field strength, l is the coil wire length that is inside of and orthogonal to the magnetic field, B, and i is the current within such length of wire, l.

Rotary head actuators generally are called for in the case of smaller disk systems. These actuators typically are fashioned as a dual sided pivot arm, pivotally movable about bearings mounted, in turn, upon a fixed pivot shaft. One side or component of the arm carries the head, while the opposite side is driven in fulcrum based fashion about the shaft. A voice coil form of drive usually provides the involved pivotal drive. The disk drive manufacturing community has tended to favor the use of rotary actuators because of lower manufacturing costs and the ease of their assembly.

The computer industry is now and has been placing expanding emphasis upon disk drive systems exhibiting (a) maximum data throughput at minimum power and (b) higher data storage capacity at least cost per bit of stored data for a storage device of given size. A major aspect in improvement of the above factors is concerned with density on the disk. Such bit density is the product of the flux reversals per inch of track times the number of tracks per inch (TPI). At the outset of "Winchester" technology, flying heads or sliders performed in conjunction with densities of about 500 TPI. In short order, densities of 1,000 TPI became conventional and densities in the range of 3,000–5,000 TPI are contemplated as feasible, given that investigators will solve a variety of posed technical problems.

While bearing problems associated with the spindle motors rotating disks have been an important limitation in the evolution of track density, solutions to those problems are considered to be on their way. The second, most serious limitation regarding TPI or bit density has to do with the ability of the head positioning actuator to move to a new position quickly at low power and to be mechanically stable after its arrival.

One aspect of track positioning inaccuracies encountered as bit densities increase and track widths become smaller resides in the movement or flexure of bearings and shaft as an actuating force is imposed upon the actuator assembly including the bearing components thereof and is opposed by reaction force at the pivot shaft. For example, where one side of a rotary head positioner is subjected to a force to cause a rotation about a pivotal shaft or fulcrum, that force will be reflected in an opposite direction at the shaft through the bearings. These bearings represent a spring system which also is subject to that force. Generally, ball bearings are used for these fulcrum structures because of the very high stiffness yet low friction that can be attained where sufficient pre-load is provided to the bearing assembly. The ball bearings act as a spring with a high spring rate, the higher the pre-load the higher that spring rate. However, the higher the pre-load, the shorter the life of the bearing and the sooner head positioning anomalies will occur. As pre-loading becomes greater to accommodate for tracks of smaller widths, as measured in microns, bearing support flexure can easily alter head position by one-fourth of the track width or more. Because small disk drive based computers very often are being carried by users in mobile environments, present industrial specifications call for no more than a 20% displacement of a track width during the imposition of a 10 g side load upon the structure. Such specifications are expected to become even more stringent. This calls for both higher preloading and static balance. As pre-load is increased on the tiny bearing structures, the arm components begin to be difficult to move, the actuator components themselves having very little power. Additionally, a highly pre-loaded bearing will often exhibit friction or "stiction". In the case of the latter phenomena where linearly increasing current is applied to the actuator, arm movement does not take place. As the current is further increased to create greater rotational force, the arm will "break loose" as it were, to move quickly from its stuck position and exhibit entirely unpredictable and unacceptable performance. This stiction phenomena is increasingly important as the actuator components become smaller; with proportionately lower torque, as the market trend toward decreasing disk drive size continues. As is apparent, one important aspect in the evolution of improved small disk drives resides in a solution to these induced side forces at the bearings of the pivot structure of rotary head actuators.

SUMMARY

The present invention is addressed to rotary positioning systems and apparatus wherein a torque is coupled with a pivot arm. That pivot arm preferably is configured for rotation at a location coincident with the center of gravity of the apparatus. The arrangement has particular utility in conjunction with the actuator arms employed with rotary head positioning assemblies used in conjunction with disk drives. By coupling a torque to the actuator arm for the purpose of causing its rotation, the forces otherwise imposed at the pivot shaft and bearings associated therewith are substantially minimized to improve the accuracy of positioning of the system.

In one embodiment of the invention, the actuation arrangement is comprised of permanent magnets of given length defining a torque arm which are attached to the actuator arm itself. This assemblage of permanent magnets then is located such that the magnetic field developed substantially at the magnet tips of the assemblage react with current flowing through a stationary coil. The result is the development of two substantially equal, opposite and spaced-apart forces, F, generated by current, i, within the coil of active length, 1, and a magnetic field of value, B, under the relationship: $F=Bli$. In another embodiment, the coils of this coupling arrangement are mounted upon the pivoting arm and move in relation to selectively configured permanent magnets. By so selectively configuring the magnets, the torque coupled into the arm at the coils may be adjusted to exhibit a uniform value throughout the practical range of pivoting of the associated actuator arm.

Another feature of the invention is to provide rotary positioning apparatus which includes an actuator body having a given mass characteristic, first and second longitudinally spaced apart end positions, and a center of gravity. A pivot member is provided for rotatably supporting the actuator body at a location remote from a pivot member, the torque being applied at a location between the first and second end positions and a couple arrangement is provided for applying a torque to the actuator body without substantial reaction forces on the pivot member by the application of torque defining, oppositely directed and spaced-apart forces thereto generated by current, i, within a coil of active length, 1, and a magnetic field of value, B, under the relationship: $F=Bli$, to effect a predetermined pivotal movement of the actuator body about the pivot member.

Another feature of the invention provides a rotary actuator for positioning a head at select locations adjacent a surface of a memory disk which includes an arm member of given mass having a first end portion for supporting the head, an oppositely disposed second end portion and a center of gravity location disposed therebetween. A pivot member is positioned adjacent the disk which rotatably supports the arm member substantially at the center of gravity location thereof. First and second coils are mounted upon the arm member second end portion remotely from the pivot member which represent with the head, a portion of the mass and which are spaced apart a distance for deriving opposite, spaced forces forming a torque and are energized to carry current generating electromagnetic fields. First and second permanent magnet assemblies are fixed with respect to the coils and located in spaced adjacency therewith for establishing magnetic fields with the electromagnetic fields generated by the first and second current carrying coils to develop spaced, oppositely directed, and substantially equal forces which sum to derive substantially pure torque at the first and second coils.

Another feature of the invention provides a rotary actuator for positioning a head at a select location adjacent the surface of a memory disk which includes an arm member of given mass having a first end portion for supporting the head and oppositely disposed second end portion spaced therefrom. A pivot member is positioned adjacent the disk and rotatably supports the arm member intermediate the first and second end portions. A permanent magnet assembly is mounted upon the arm member second end portion, representing with the head a portion of the mass, including a first permanent magnet having a torque moment defining dimension extending along a longitudinal axis between first and second magnet poles. A coil assembly, fixed with respect to the arm member and having windings positioned to intercept magnetic flux emanating from the first permanent magnet is provided for carrying current developing oppositely directed torque-defining forces substantially at the first and second magnet-poles to effect pivotal movement of the arm member about the pivot member without applying substantial reaction forces thereon.

Other objects of the invention will, in part, be obvious and will, in part, appear hereinafter.

The invention, accordingly, comprises the apparatus and system possessing the construction, combination of elements, and arrangement of parts which are exemplified in the following detailed description.

For a fuller understanding of the nature and objects of the invention, reference accompanying drawings.

BRIEF DESCRIPTION OF THE DRAWINGS

FIGS. 24A-24C show a schematic representation of a pair of coils employed according to the invention in conjunction with corresponding magnet segments which are spaced apart showing three different orientations of such coils;

FIGS. 25A-25C show the spaced coils of FIGS. 24A-24C associated with magnet sections of different configuration;

FIGS. 26A-26C show the coil structures of FIGS. 24A-24C with split magnet component structures;

FIGS. 27A-27C show the coil structures of FIGS. 24A-24C as superimposed upon split magnet structures and performing in conjunction with an offset pivot position;

FIGS. 28A-28C show the coils revealed in FIGS. 27A-27C in conjunction with magnet structures which are offset and further revealing an offset pivot position; and FIGS. 29A-29C show the coil and magnet associations of FIGS. 28A-28C but with the incorporation of additional magnetic material creating notch-like structures.

DETAILED DESCRIPTION OF THE INVENTION

Figure 1:
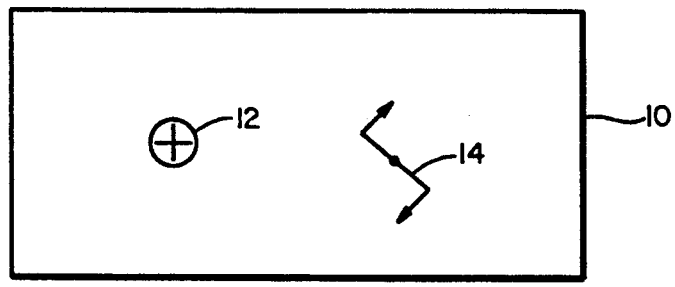
FIG. 1 is a schematic representation of a free body with center of gravity and a coupled pure torque.

The characteristic of performance of the rotary head actuator of the invention is perhaps best initially described in connection with the action of a free body to which certain dynamic phenomena are applied. In this regard, reference is made to FIG. 1 where a free body is schematically depicted at 10 having a center of gravity represented at 12. As is well known and amply demonstrated in connection with space vehicle systems and the like, a torque produced on such a free body 10 will cause it to attempt to rotate about its center of gravity 12. Thus, if a mechanical couple is placed anywhere upon the body 10, the body 10 will tend to rotate about center of gravity 12. Such a pure torque couple is represented in FIG. 1 at 14. The head actuator designs described in the discourse to follow look to this principle through designs approaching the free body aspect of a torque couple 14 applied to a body so structured as to be pivotable about its center of gravity. With this approach, ideally, none of the shaft developed resisting forces exhibited by typical fulcrum based voice coil actuated head actuator assemblies are involved. The designs also will be called upon to meet the constraints of the packaging envelope imposed by the disk drive designer and fabricator and further to provide necessary static balance of the system to meet specifications concerning impactability and the like as above discussed. The pure torque or couple 14 is developed with a coil and magnetic field approach based upon the Faraday "B Cross i" principle which states that a wire carrying current, i, will experience a force, F, perpendicular to the current when the wire is placed in a magnetic field with intensity, B, which orientation is also perpendicular to the wire. The direction of force will be perpendicular to both current and field orientation. A development of a torque utilizing this principle can be achieved in conjunction with a head structure wherein the magnetic field is produced by magnets attached to the head actuator arm or, conversely, by coils attached thereto. Design trade-offs will occur with respect to the selection of either, the choice depending upon the actual embodiment for an actuator head then being addressed by the investigator.

Figure 2:
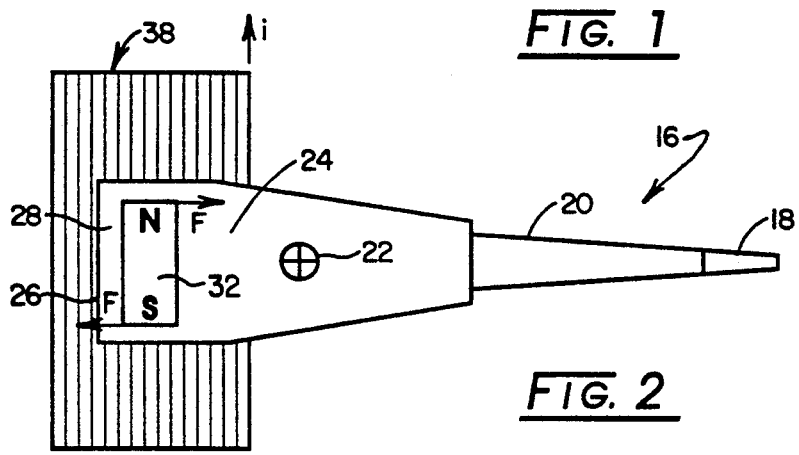
FIG. 2 is a top view of an actuator arm representing one embodiment of the invention.
Figure 3:
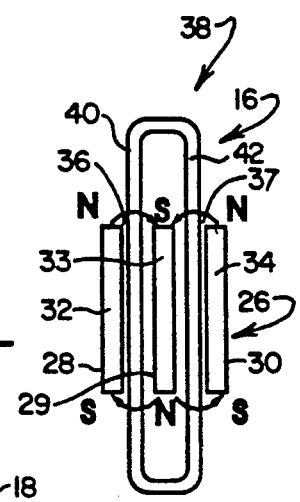
FIG. 3 is an end view of the actuator arm of FIG. 2.
Figure 4:
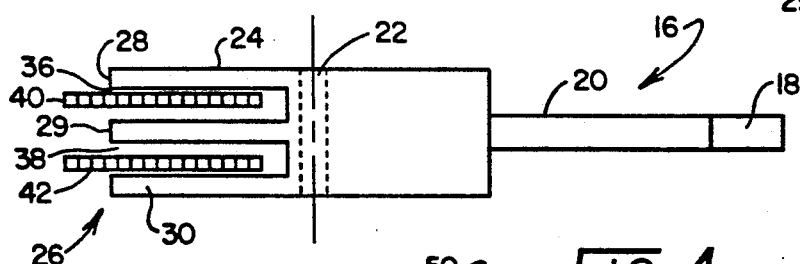
FIG. 4 is a side view of the actuator arm of FIG. 2, showing a coil in cross-section.

Looking to FIGS. 2 through 4, a design approach for a head actuator represented generally at 16 is illustrated wherein a torque couple is developed by a head carried permanent magnet structuring performing within a surmounting coil assembly. Actuator 16 is shown having a head 18 mounted upon one side 20 of which extends from pivot mount 22. The opposite side 24 of the actuator 16 extends from the pivot 22 to a support region 26. Region 26 is formed in trifurcate fashion including the three magnetic magnet support components seen in FIGS. 3 and 4 at 28-30. FIG. 3 further reveals that each magnet support component 28-30 supports a bar-shaped permanent magnet shown, respectively, at 32-34. It will be observed that the length of these permanent magnets between their north and south poles constitutes the torque arm of a torque couple evolved with the actuator 16. Magnet support components 28-30 are intersticed to define gaps such as at 36 between components 28 and 29 and at 37 between components 29 and 30. Within these gaps 36 and 37 there are disposed the elongate windings of a coil structure represented generally at 38 and having oppositely-disposed coil components 40 and 42 disposed within respective gaps 36 and 37. FIG. 3 shows arrows indicating the desired magnetic flux paths between the north and south poles of magnets 32 and 33 and 34 and 33. Thus, by applying a current, i, to the coil structure 38, forces represented at 14 in FIG. 1 (F in FIG. 2) are developed at the tips of the magnet structures which are spaced by the length of the permanent bar magnets themselves, a distance representing a torque arm. The resultant torque is coupled to the actuator 16 to evolve a rotation about the center of gravity pivot 22 which is substantially free of shaft responding forces now sought to be avoided. An advantage of the utilization of a structure such as shown at 16 resides in the unfettered or free movement of the magnet structure within the excited coil structure 38. In this regard, while the coil 38 requires a lead input for current development, no such inputs are required for the magnet structure.

Figure 5:
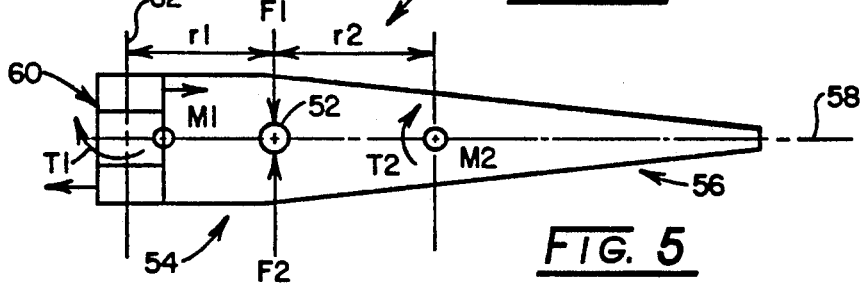
FIG. 5 is a schematic representation of an actuator arm configured according to the invention employed in an analysis thereof.

Looking to FIG. 5, a schematic portrayal of an actuator arm is represented at 50 for the purpose of analyzing the above-described coupling arrangement. The arm 50 may be considered to be pivoted about a shaft 52 and to have a first body portion 54 having a center of mass designated by the circle M1. Oppositely disposed is a second body portion 56 having a center of mass which may be designated by the circle M2. The longitudinal center line of the arm 50 is represented at 58, while an orthogonally disposed instantaneous center line or center of movement for the orientation shown for the magnet structure 60 is represented at 62. Assuming the shaft 52 to be located at the center of gravity of the arm 50, and neglecting gravity and other external forces, a torque, represented by curved arrow T1 generated by the above-described structure will evoke a force at the shaft 52 represented at F1, a center line 63 being positioned at a radius of gyration represented at r1. There then results a torque represented at curved arrow T2 which creates an equal and opposite force F2 at the shaft 52. This torque, T2, and mass, M2, are seen to be positioned a radius of gyration distance, r2, from shaft 52. The equating of force F1 with F2 is developed as a consequence of Newtons third law of motion, "To every action there is always opposed an equal reaction." With the proper selection of the radii of gyration, r1, r2, and the masses, M1, M2, there results a condition wherein no significant forces are applied to shaft 52.

Figure 6:
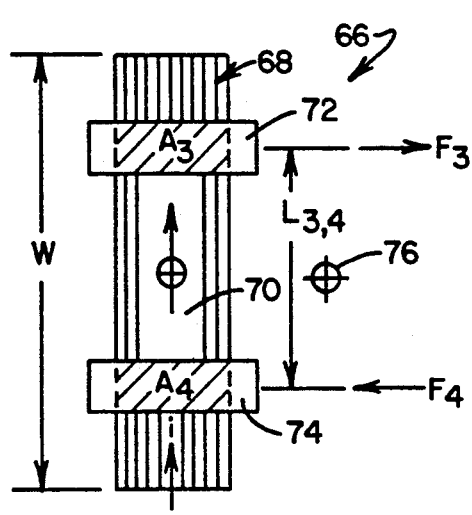
FIG. 6 is a schematic view of a torque deriving drive arrangement showing one orientation thereof.

In the illustration of FIGS. 2-4, the bar magnets as at 32-34 are configured having a relatively straightforward or simple rectangular shape. Inasmuch as the structure 16 defines an arcuate locus of travel, the coil-magnetic field exposure will vary during rotation in accordance with the cosine of the angle of such rotation. Thus, the magnets may be shaped, for example, with respect to their pole tips to evoke a substantially constant coupling torque throughout the arcuate locus of motion of the acutator arm 16. Looking to FIG. 6, a schematic representation of a geometry wherein the pole tips of the magnets are transversely expanded is portrayed. The coil and magnet assemblage is represented generally at 66 as including a coil 68 having a length, W, and being associated with a magnet structure 70 having tips which are expanded orthogonally with respect to its central axis and are revealed at 72 and 74. It is assumed that this assemblage 66 will be pivoted about pivot point 76, again representing a center of gravity of an associated arm component. In the orientation shown in FIG. 6, the magnet 70 will provide a mean coil coverage represented by the coil and magnet confronting areas A3 and A4. The orientation shown in FIG. 6 will result in the torque defining forces F3 and F4 which are spaced apart a torque arm distance L3, 4. As the associated head positioning arm rotates about pivot 76, however, the length, L, will vary with respect to the cosine of the angle of rotation.

Figure 7:
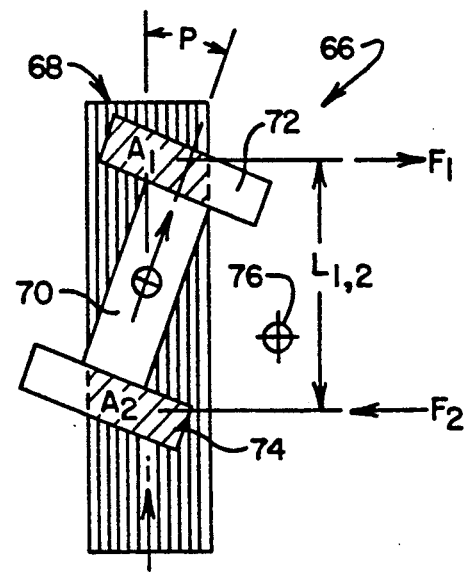
FIG. 7 is a schematic representation of the device of FIG. 6 at a different pivotal orientation of the magnetic component thereof.

Looking to FIG. 7, as the magnet travels about pivot 76, for example to a point having a position angle represented at P, the areas of confrontation of the expanded pole tips 72 and 74 respectively change to the cross hatch values represented at A1 and A2. The torque arm between the effective centers of these regions now becomes L1, 2 which is larger than the torque arm, L3, 4 represented in FIG. 6. A comparison of FIG. 7 with FIG. 6 reveals that by adjustment of the configuration of the magnet structure, for example at its pole or otherwise, and by recognizing the alteration of torque arm length, the resultant torque forces represented at F1 and F2 can be adjusted to evolve a torque equivalency substantially with respect to any position of practical rotation of the system. While the cosine related problem is minor, the arrangement shown in FIGS. 6 and 7 indicates that it is solvable utilizing a component shaping approach.

Figure 8:
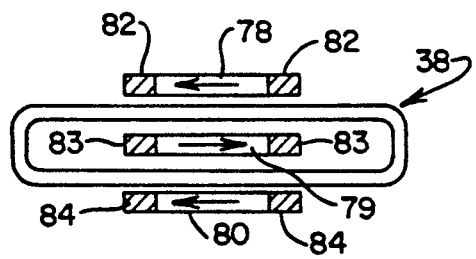
FIG. 8 is an end view of an alternate embodiment for the magnet structuring of the device of FIG. 2.

In the discourse set forth above in connection with FIG. 3, the magnetic field flux concentration is indicated as being at or emanating from the tips of the three bar magnets 32-34. In general, such fields do not necessarily emanate from the ends of the poles to enter an associated magnetic pole. In fact, the fields are leaking all along the magnets. However, the fields can be forced towards the ends of the bar magnets to achieve a maximized torque arm length by incorporating ferrous or steel pieces at the ends of the magnets. The steel or ferrous material tends to concentrate flux better than the magnets themselves. The configuration and its implementation is quite simple. For example, looking at FIG. 8, the coil structure 38 again is represented by that numeration in conjunction with three bar magnets 78-80 which correspond with respective magnets 32-34 described in conjunction with FIGS. 2-4. However, these magnets 78-80 are seen to be combined with respective ferrous or steel tip components 82-84 to achieve maximized flux concentration. The polar orientation of the magnets 78-80 are represented by the half arrows shown thereon.

Figure 9:
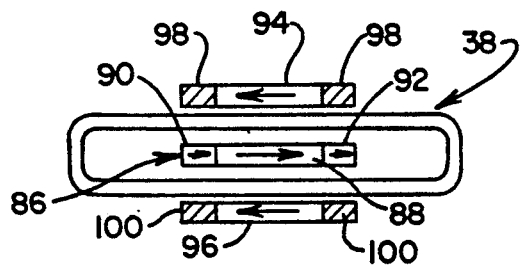
FIG. 9 is an end view of still another embodiment for the magnet structure of the device of FIG. 2.

Another improvement to the system of FIGS. 2-4 can be achieved through employment of a combination of magnet types. Looking to FIG. 9, the coil 38 again is reproduced with the same numeration. However, the interior magnet for this structure is represented generally at 86. The magnet structure 86 combines an Alnico (aluminum nickel cobalt) interior component 88 which is relatively inexpensive and easily demagnetized but which exhibits a high flux density which, for example, permits it to provide a high magnetic field in the gaps 36 and 37 of FIG. 3 which contain the coil windings. By combining the Alnico magnet component 88 with two rare earth magnet caps as 90 and 92, the high coercivity characteristics of the rare earth magnet material are combined with the improved flux density of the Alnico magnet 88. The magnet assemblage 86 is shown combined in FIG. 9 with oppositely disposed rare earth magnets 94 and 96. As in the case of FIG. 8, the magnets 94 and 96 may be combined with iron or ferrous caps shown, respectively, at 98 and 100. Yet another alternative is that magnets 94 and 96 also are made from Alnico material with similar end caps at 98 and 100 made from rare earth magnets. The resulting system in either case is of a higher air gap field characteristic than can be produced with either material alone and the Alnico component 88 is caused to operate at a higher operating point than otherwise would be the case. With the combination shown, the desired properties of each magnet type are improved.

Figure 10:
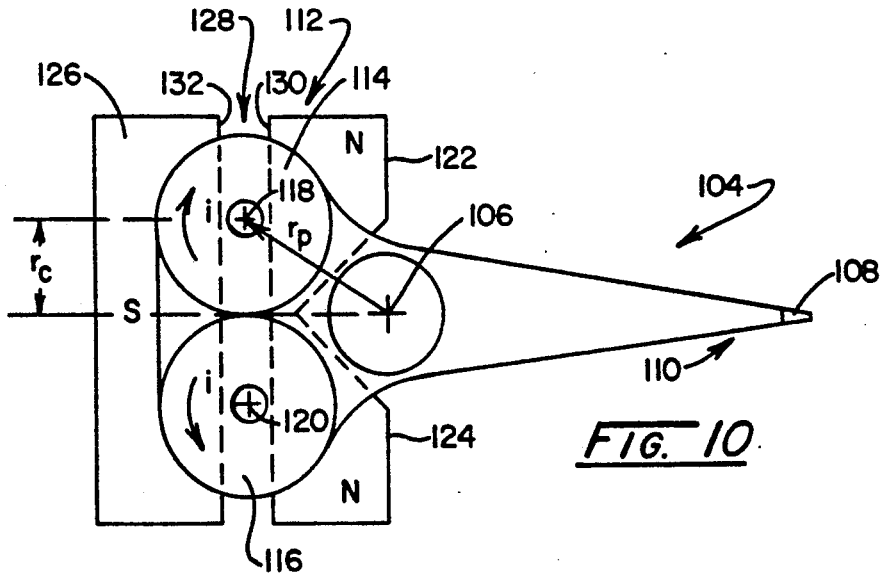
FIG. 10 is a schematic representation of another embodiment of an actuator arm assemblage according to the invention with portions removed to reveal internal structure.

Now considering an actuator arm approach according to the invention wherein the coil component of the actuator moves with the arm, reference is made to FIG. 10. In the figure, the actuator arm is represented in general at 104 configured for pivotal movement about a shaft or pivot 106 and having a head component 108 at one end 110 thereof. The opposite end 112 of the arm 104 supports two flat coils represented at 114 and 116. The centers of these coils are shown, respectively, at 118 and 120. Note that the center 118 is shown to be positioned in pivot radius, $r_p$, from the pivot 106. The center 120 of coil 116 will be equivalently positioned at such pivot radius.

Coils 114 and 116 may be mounted for movement within a gap between one or two sets of magnets, depending upon the design of the actuator, only one set being revealed in this drawing. In this regard, two magnet segments are revealed, one being a north polarized magnet 122 having a notch represented in phantom at 124 cut out to accommodate for pivot 106. The second magnet is a south polarized one as shown at 126. Note that the magnets are spaced apart by a gap represented at 128 defined between the edges 130 and 132 of respective magnets 122 and 126. The outer lines of coils 116 and 114 are in close adjacency such that the distance between their centers 118 and 120 represents a torque arm, the corresponding torque radius being shown in the figure as: $r_c$. It may be observed that the pivot radius, $r_p$, represents a moment arm or lever arm which would be evolved in the case of a conventional voice coil actuated head actuator arm. However, by contrast, the torque coupling radius of the instant embodiment is different and is represented at $r_c$. In accordance with the criteria above discussed, it is desirable that the pivot 106 be positioned essentially at the center of gravity of the entire assemblage and that a static balance exist between the two arm portions or ends with their associated components as at 110 and 112. In operation, a current, i, is caused to flow in each of the coils 114 and 116 in the directions labeled thereon by the curved arrows. Torque creating forces are then evolved in conjunction with a magnetic field developed between the current carrying coils and magnet components 122 and 126 and an oppositely disposed magnet pair (not shown) adjacent to and aligned therewith. A coupled torque is evolved with the arrangement shown. If only one set of magnets is used by the drive designer, then a ferrous means of magnetic flux return path must be provided in place of the aforesaid oppositely disposed magnet pairs.

Figure 11:
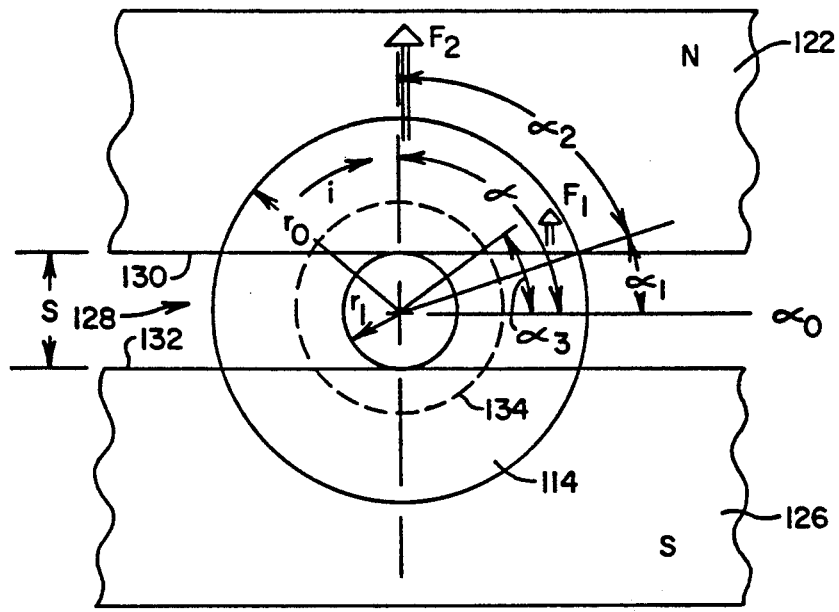
FIG. 11 is a partial schematic view of the device of FIG. 10 showing symbols employed for the analysis associated therewith.

Looking to FIG. 11, a generalized representation of the force evoking characteristics of the moving coil arrangement of FIG. 10 is portrayed. In this regard, the coil 116 is again shown in conjunction with magnet segments 122 and 126 as well as the corresponding edges 130 and 132 thereof. The gap 128 is represented having a dimension, S, and the center of the coil is shown having a radius, $r_i$. The outer radius of the coil again is represented by the notation, $r_o$, and the current flow is represented by the arrow labeled "i". As is apparent, the active length of coil turns will vary with the orientation of the coil 116 with respect to the gap 128. Additionally, by so supplying a segmented magnet pair as shown, an avoidance of a substantial amount of force reversal as the coil moves is achieved. In this regard, consider the condition when the center line of the coil would reach the edge of a magnet. The gap avoids this reversing force to a practical extent. The average circumference of the windings of the coil 116 is represented by dashed line 134 and the extent of half of the coil involvement with magnet 122 is shown by the angular designate $\alpha 2$. Force, F1, is represented in the drawing showing the force in the desired direction on a wire of coil 116 just as current crosses the leading edge of the magnet. A force designated, F2, represents the force on the wire at that upper region. In effect, the coil 116 will have radially directed forces oppositely disposed ones of which will cancel and, through appropriate geometry, can be arranged such that an average or net force is evolved in the torque defining direction desired. The average force vector amplitude of the generalized system described will be:

$$\text{Avg. } F_1 \text{ vec. amp.} = \Sigma \sin \alpha \Big|_{\alpha_1}^{90°} \quad (1)$$

The average circumferences 134 may be described as being equal to:

$$\text{Avg. cir.} = (r_I + r_o)\pi \quad (2)$$

The active length of the coil, 1, may be estimated as:

$$\text{Active } 1 = \text{turns } (r_I + r_o)\pi \left[1 - \left(4 \times \frac{\alpha_3 - \alpha_o}{360}\right)\right] \quad (3)$$

Where it may be observed that $\alpha_3$ is a force vector angle of the average circumference 134 at the edge of a given magnet segment. The total force evoked with the generalized arrangement described may be set forth as follows:

$$\text{Total Force} = \text{Active } 1 \times \Sigma \sin \alpha \Big|_{\alpha_1}^{90°} \times Bi \text{ [NEWTONS]} \quad (4)$$

Total force will be given in the international standard MKS units of NEWTONS if B is in Tesla, 1 in meters and i in amperes. Additionally, the summation of the $\sin \alpha$ term in expression (4) may be considered to be a force vector.

Figure 12:
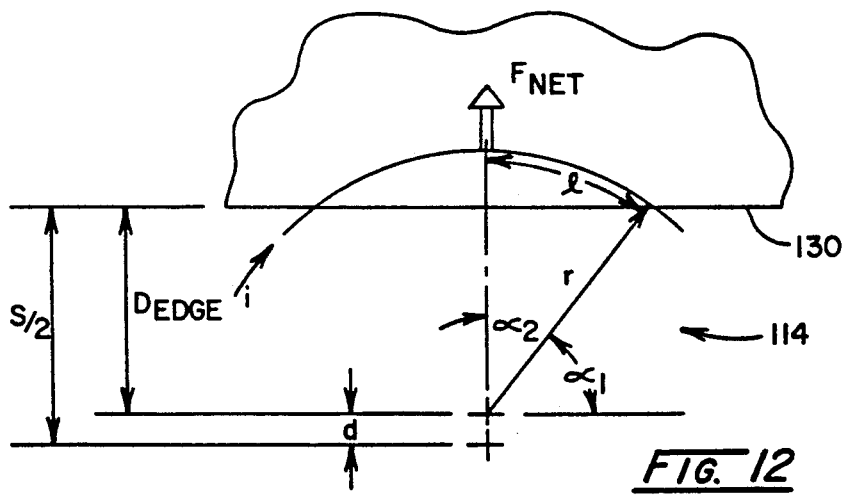
FIG. 12 is a diagram of components of the device of FIG. 11 showing symbolism employed in the analysis thereof.

A more precise calculation of Active 1 is obtained by evaluating the forces acting on each layer of coil winding. Referring to FIG. 12, a schematic portrayal of the coil and magnet arrangement of FIG. 11 again is presented for the purpose of describing components and parameters in the evaluation of change in force due to angular displacement of the head actuator arm. The space, S, is again represented as the gap 128 between magnet edges. The value, DEdge, is the distance from the coil center to the magnet edge with respect to a displacement of the coil represented as, d. Net force is represented as: Fnet and the term, 1, represents active length for one layer of coil windings. Additionally, it may be observed that the angle, $\alpha$, will have a limit due to the edge of a magnet component as is identified as $\alpha_{lim}$ in connection with FIG. 13. Now considering an evaluation of force with respect to angular position, from expression (4) above, the following value of force per layer of coil winding may be expressed:

F/layer Active 1/turn×turns/layer×force
factor×B×i[NEWTONS] (5)

Where the force factor is as above described in connection with expression (4), the summation of the $\sin \alpha$ from $\alpha$ to 90°. Expressing angle in radians, the length, 1, may be set forth as:

$$l = r\alpha_2 \quad (6)$$

The sine of $\alpha_1$ may be expressed as follows:

$$\sin \alpha_1 = \frac{D \text{ Edge}}{r}$$

and the value of $\alpha_2$ may be expressed as:

$$\alpha_2 = \pi/4 - \alpha_1 \quad (8)$$

Where $\alpha_1$ is of value less than the $\alpha$ limit (FIG. 13), then the value, $\alpha_1$, may be set to equal the $\alpha$ limit value and for any coil displacement:

$$D \text{ Edge} = \left|\frac{S}{2} + d\right| \quad (9)$$

The radius, r, with respect to any layer number may be expressed as follows:

$$r(\text{layer}\#) = \frac{\text{Coil Wall}}{\text{layers}} (\text{layer}\#) + \text{coil } I \text{ rad} \quad (10)$$

where "Coil Wall" is the outer extent of the coil minus the internal radius of the coil (CoilWall=$r_o-r_i$) and "layers" are the total number of layers within the coil and "Coil Irad" is the internal radius of the coil to the layer # under analysis. For any half coil under analysis, the active length of net length of coil wire may be considered as follows:

$$\text{Active } l = 2^* \Sigma[\text{Net } l_{\text{layer } \#1} + \text{Net } l_{\text{layer } \#2} \cdots + \text{Net } l_{\text{layer } \#n}] \quad (11)$$

and the earlier discussed force factor becomes:

$$\text{Force Factor} = \int_{\alpha_1}^{\alpha_{lim}} \sin \alpha_1 \, d(\alpha) + 0 \quad (12)$$

Figure 13:
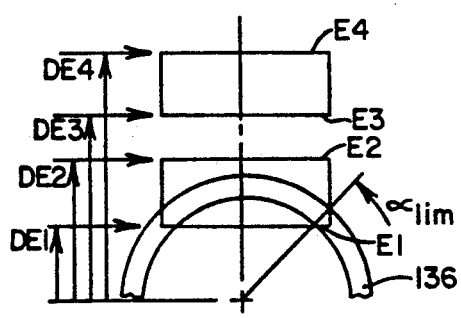
FIG. 13 is a schematic diagram of a moving coil embodiment of the invention identifying edges and parameters for analysis.
Figure 14:
FIG. 14 is a schematic diagram of a magnet edge and coil component employed for analysis in the description of the invention.
Figure 15:
FIG. 15 is another schematic diagram of a magnet edge and coil component employed for analysis in the description of the invention.

Segmenting the magnetic components even further, reference is made to FIG. 13 where coil 136 having a direction of motion considered to be positive in a sense considered upwardly in the figure is portrayed. The term $\alpha_{lim}$, is also represented. The analysis to follow considers any evolution of an evaluation of net length for any position of the coil 136. In particular, this is considered in connection with four edges of magnets. By evolving an analysis of a circular coil in conjunction with such edges, information is developed which permits the use of a circular coil structure while obtaining substantially uniform driving torque for any position of the actuator arm. The edges involved are designated E1-E4 and the earlier-described distance to the edge from the coil center as discussed in conjunction with FIG. 12 is represented by the grouping DE1-DE4 for the respective edges E1-E4. In the discourse to follow, the upwardly disposed edge is considered the positive edge. The force developed by any one layer of the coil under investigation is the sum of: F=bli, where l is defined by the edges E1-E4. Now considering relative movement, and looking to FIG. 14, the edge, E1, again is portrayed and an active length, $l_1$, for one layer of a wire is portrayed. FIG. 15 represents a condition at edge, E2, the length, $l_2$, being considered to yield zero force and the net length, $l_1$, is considered to include the dotted component shown in the figure as well as length, $l_2$, shown in solid form. The net length for this condition may be expressed as follows:

$$\text{net } l_1 = l_1 - l_2 \quad (13)$$

Figure 16:
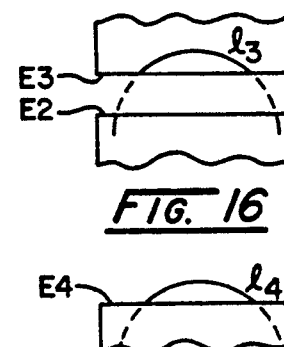
FIG. 16 is another schematic diagram of a magnet edge and coil component employed for analysis in the description of the invention.

Looking to FIG. 16, edges E2 and E3 are portrayed for a positive force condition. The calculation of all three does not include the dashed components shown. Similarly, a calculation of length, $l_2$, (the dashed indication) includes the value, $l_3$. A net length may be described with respect to this configuration as follows:

$$\text{net } l_2 = l_2 - l_3 \quad (14)$$

Figure 17:
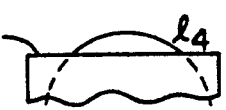
FIG. 17 is another schematic diagram of a magnet edge and coil component employed for analysis in the description of the invention.

Now looking to FIG. 17, geometry with respect to edge, E4, is revealed. The length, $l_4$, will yield zero forces and the calculation of length, $l_3$, (the dashed line portion) includes the value $l_4$. The net length for component, $l_3$, may be expressed as follows:

$$\text{net } l_3 = l_3 - l_4 \quad (15)$$

From the foregoing, it may be observed that for any one layer of the coil, the net length at any position may be expressed as follows:

$$\text{net } l = (l_1 - l_2 + l_3 - l_4) \quad (16)$$

It may be observed that optimized magnet geometry may be generated with respect to any given packaging envelope criteria where it, for example, is desired to employ circular coils which are more easily wound and less expensive than non-circular configurations. Of course, coils of other shapes may be employed to achieve a linearization of developed forces.

Figure 18:
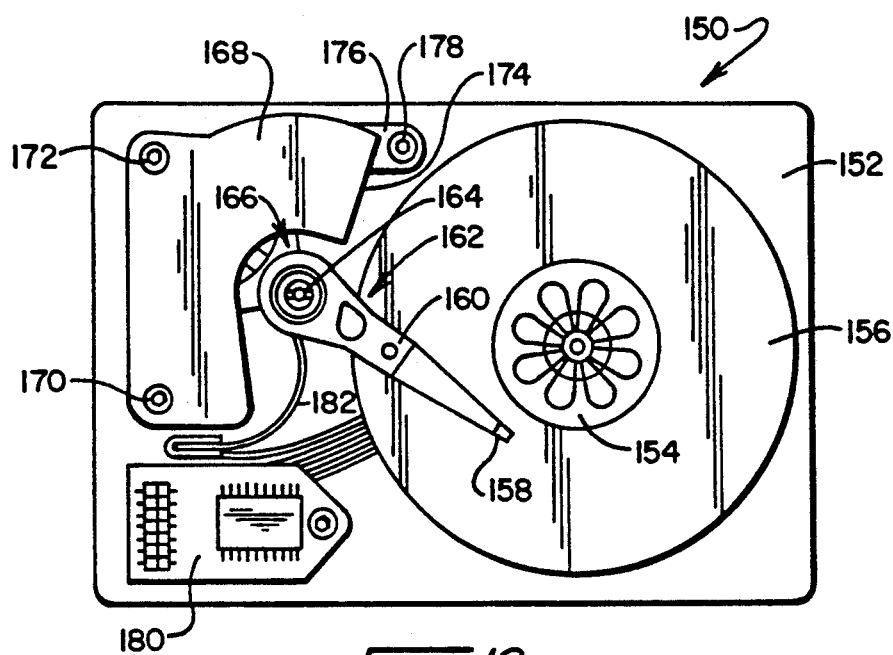
FIG. 18 is a plan view of a disk drive assembly incorporating the features of one embodiment of the invention.

Looking to FIG. 18, a representation of a somewhat conventional disk drive assembly is revealed generally at 150. Assembly 150 includes a base or housing 152 incorporating an appropriate spindle motor or the like, portions of which are revealed at 154, which, in turn, supports and rotates a memory disk 156. The surface of disk 156 cooperates with a head 158 mounted upon one side 160 of an actuator arm represented generally at 162. Arm, 162, is pivotally mounted at a shaft assembly 164 and extends having an opposite side 166 extending rearwardly therefrom. This opposite side is seen covered by a metal top plate 168 which is supported by bolts 170 and 172 and associated spacers (not shown) above the top surface of base 152. A folded down portion of plate 168 at 174 supports that end of the component and provides a magnetic return path. Another plate is mounted below the side 166 of arm 162, only a portion thereof being revealed at 176 in conjunction with a bolt 178. Plate 178 will be seen to function as a magnetic return component. A control circuit is represented in the drawing at 180 and one flexible lead assembly is represented at 182 extending to the arm 162 for communication both with head 158 and with coils mounted at side 166. In general, the magnetic components performing in conjunction with head 162 are mounted on the bottom side of plate 168 and interact with coils mounted at side 166 under the criteria described above providing for the coupling of a torque to evoke pivotal movement of arm 162.

Figure 19:
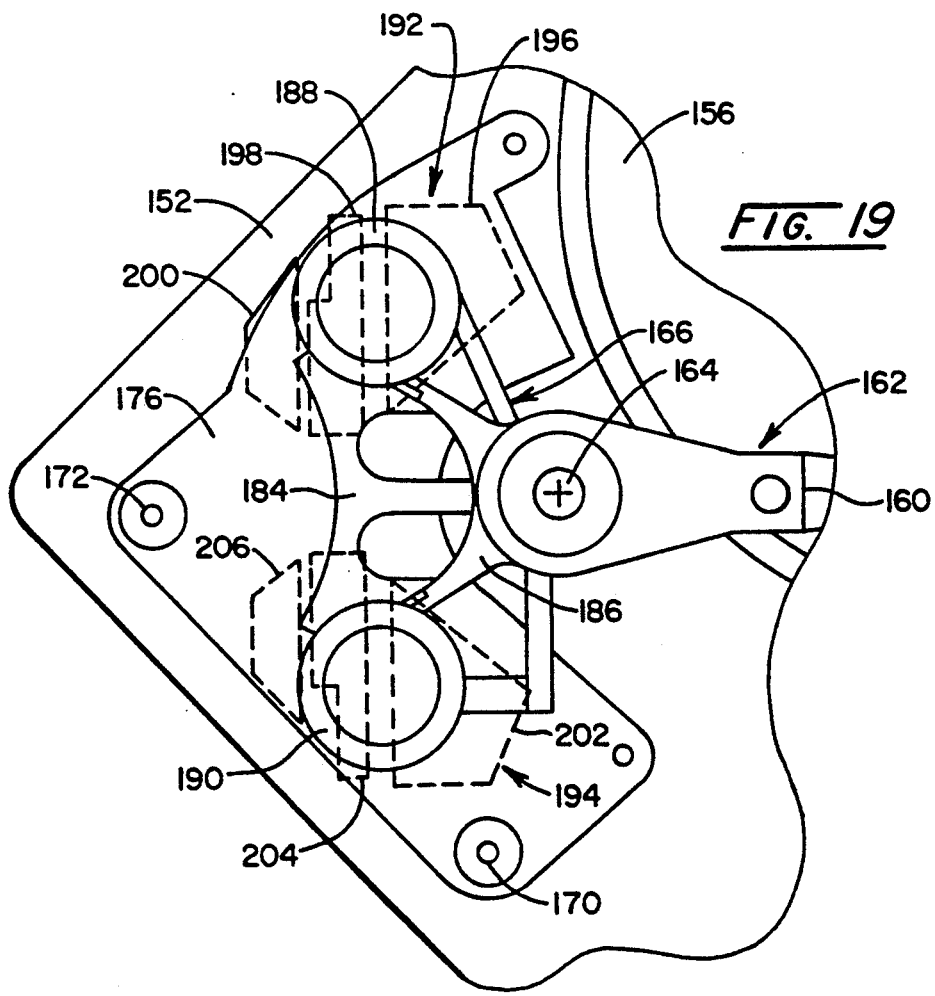
FIG. 19 is an enlarged partial view of the actuator arrangement of the device of FIG. 18 with portions removed and broken away to reveal internal structure.

Looking to FIG. 19, the side 166 of arm 162 is represented at a higher level of detail, showing side 166 as including an insert 184 which functions with a Y-shaped yoke component 186 to support two flat coils 188 and 190. Shown in phantom in the figure are permanent magnet assemblies 192 and 194 associated with respective coils 188 and 190. Assemblies 192 and 194 are shown in phantom to illustrate their geometry and relative positioning in the device. The phantom illustration is employed inasmuch as, as noted above, these assemblies are mounted upon the inwardly facing side of upper plate 168. Note that assembly 192 includes a trapezium shaped segment 196, a notched rectangular segment 198, and a trapezoidal segment or component 200. Assembly 194, in effect, is a mirror image version of assemblage 192 arranged with respect to coil 190 in correspondence with the association of coil 188 and assembly 192. Note in this regard, a trapezium shaped segment or component 202, a notched rectangular component 204, and a trapezoidal segment of component 206.

Figure 20:
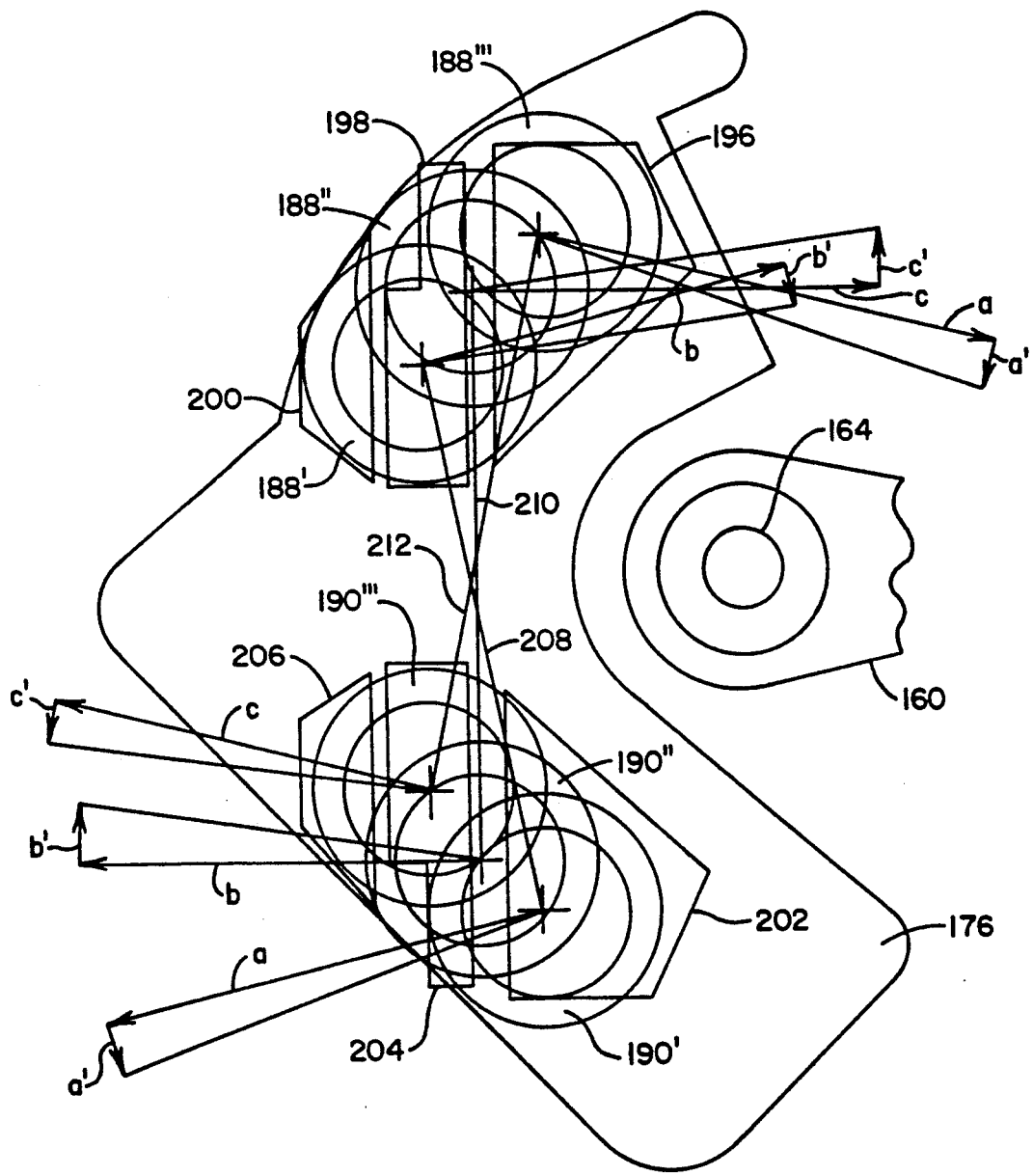
FIG. 20 is a schematic enlarged, partial representation of the apparatus of FIG. 19 showing a graphic vector analysis associated therewith.

Looking to FIG. 20, a graphic analysis of the torque deriving vectors achieved with the geometry shown at FIG. 19 is revealed. In the figure, the coils 188 and 190 are shown in progressive clockwise movement from orientations shown at 188', 190', through 188''', 190'''. For any given design, the basic criterion is to evoke a vector force as represented at a, b, c which is always perpendicular to an associated mechanical link between the centers of the coils 188 and 190. For the position 190', that mechanical length may be represented by the line 208; while for the coil positions 188'', 190'', the link may be represented by a line 210; and, for the orientation of the coils as at 188''' and 190''', the link may be represented as line 212. For the arrangement shown, it may be observed that the design is still in evolution. In this regard, note that a force vector of small extent is represented at a', b', c' in conjunction with the developed proper perpendicular vectors shown, respectively, at a, b, and c. These unwanted vectors, while being of small enough extent to provide for an effective device, preferably are to be avoided inasmuch as they are seen to be additive and may create a torque of direction opposite that desired. Generally, the unwanted vector components may be avoided by adjusting the geometry of the magnet segments, for example, by notching as illustrated in connection with magnets 198 and 204. Other approaches may involve, for example, magnetic region demagnetization or flux reduction. Considerations for developing optimal geometries with respect to desired circular coils are revealed in FIGS. 21-29 to follow.

As noted above, the actuator design of the instant invention is based, in part, on the Faraday "B cross i" principle which provides that a wire carrying current, i, will experience a force, F, perpendicular to the current when the wire is placed in a magnetic field with intensity, B, which orientation also is perpendicular to the wire. The direction of force will be perpendicular to both current and field orientation. In effect, the force, F, the field, b, and the current, i, are all mutually orthogonal. The term "l" in this equation is the length of wire (in meters) carrying the current that is actually in the magnetic field. Field strength, B, (Tesla) is assumed to be uniform in the region of interaction with the current, i (amperes). The resultant force in Newtons is expressed in MKS units. The design philosophy generally remains notwithstanding the configuration of the coil and involves the following aspects:

(1) define the mechanical envelope available for the actuator including the angular displacement required;
(2) determine the desired resistance of the coil, or coils, and the current, i;
(3) determine an approximation of the air-gap flux density, b, from the following design information:
   (a) determine the magnet material and magnet thickness;
   (b) determine the air-gap dimension parallel to the magnetic flux lines;
(4) define the direction and magnitude of forces, Fn, which will be developed by the orthogonal interaction of "B", "l", and "i".

Several methods may be employed to derive the above forces, Fn, which are utilized to develop a torque couple by the actuator. As noted above, a substantially round coil is generally preferred inasmuch as it has the least polar moment of inertia of any polygon and is convenient and less expensive to manufacture. Accordingly, the examples that follow use round coils for illustration.

Figure 21:
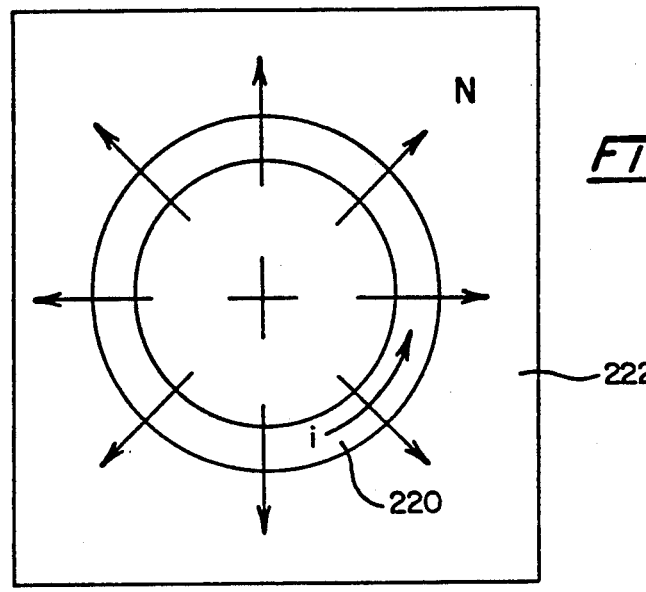
FIG. 21 is a schematic diagram of a circular coil as may be used with one embodiment of the invention superimposed upon a single pole magnet.

Referring to FIG. 21, round coil 220 is shown placed over a single pole permanent magnet 222. Thus positioned, the coil 220 will exhibit forces equal in all radial directions when energized with current as represented by the arrows shown thereon.

Figure 22:
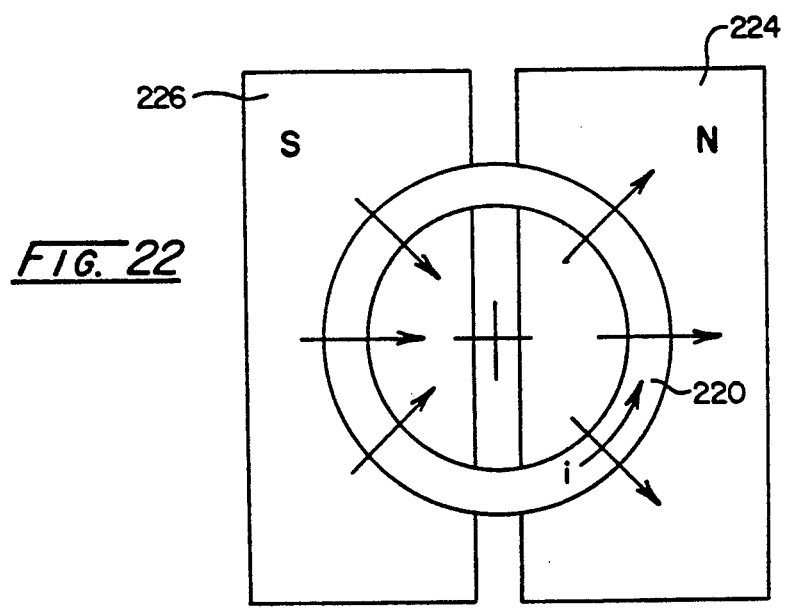
FIG. 22 is a schematic diagram of the coil of FIG. 21 superimposed over the split magnet assemblage of two different poles.
Figure 23:
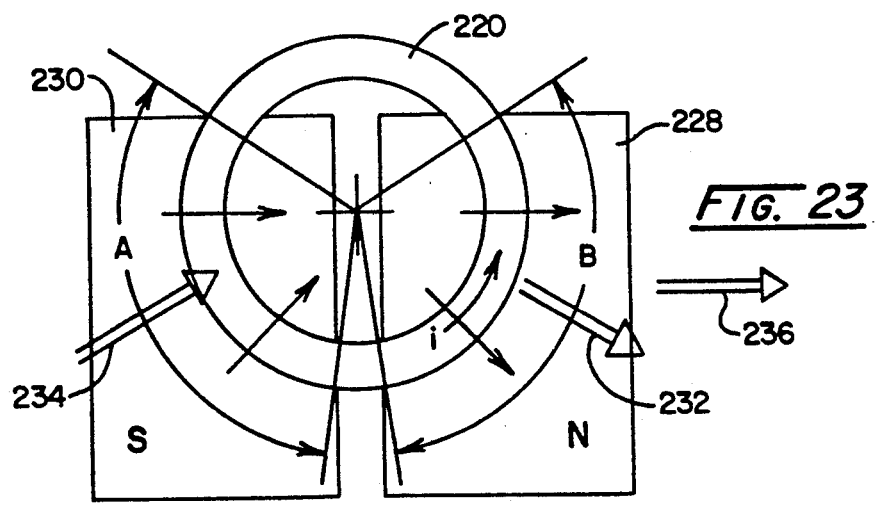
FIG. 23 is a schematic diagram of a circular coil as shown in FIG. 21 superimposed over a differently configured pair of magnet components of different polar aspects.

Referring to FIG. 22, when the coil 220 is positioned over two or more magnet components or segments of opposite polarity as shown at 224 and 226, a force is developed which may be summed in one direction. The sum for a round coil is, in effect, the average of the cosine of the angles formed by two lines originating from the coil center and passing through the two points where the edges of a permanent magnet field intersect the coil perimeter, enclosing the coil wire that is over the permanent magnet field. The force components are represented by arrows in FIG. 22.

Referring to FIG. 23, the coil 220 again is shown associated with two magnet components 228 and 230. An angle, B, is shown with respect to the center of coil 220 as subtending the intersection of the outer edge of the outer coil wire of coil 220 with the edges of magnet segment 228. Similarly, an angle, A, is shown subtended in similar fashion with respect to magnet segment 230. Accordingly, the average direction of force over the "N" pole of magnet 228 would be represented by the arrow 232 and the average direction of force over the south pole or magnet component 230 may be represented by the arrow 234. Arrows 232 and 234 represent a bisection of the angles B and A, and their vector sum may be represented by an arrow 236.

As may be recalled from the discourse presented in connection with the free body illustration of FIG. 1, a minimum of two non-aligned forces are required to create a torque in a free body. For the present example, two substantially identical coils are mounted upon the actuator and are disposed some distance from each other by a supporting structure which, in turn, is supported by the actuator head-arm assembly. As a result of the mechanical structure holding the two coils relative to each other, an imaginary mechanical link can be said to exist between the coil centers, for example as described at lines 208, 210, and 212 in connection with FIG. 20. The length of this link represents the torque arm between the two coils.

Looking to FIGS. 24A-24C, paired coils 250 and 252 are seen associated with magnet components 254a, 254b, and 256a, 256b. These coils are shown in association with a mechanical link represented at line 258 and a pivot 260. Where the mechanical link 258 is pivoted at its mid-point as shown at 260, then the resulting forces of the system will create a pure torque about that pivot provided that the permanent magnet field is symmetrically disposed and symmetrically polarized as represented in FIGS. 24A-24C. Note the force components represented by the arrows in FIGS. 24A-24C for the three orientations of the system.

The permanent magnet field may be adjusted and positioned to interact with current in the various parts of the coil to develop forces in various directions. This is illustrated in FIGS. 25A-25C which show the permanent magnetic halves as at 262a, 262b, and 264a, 264b, placed close to each other and with some of the outermost portions of the magnets removed to provide a desired force vector direction. Note the illustration of these directions as arrows in these figures for the three system orientations shown. The designation of coil, pivot, and linkage remain the same numeration as in FIGS. 24A-24C.

For an ideal pure torque actuator, the forces developed at each coil will have the following properties:

it will pass through the center of each coil which is one end of the mechanical link between the coil pair;

it will be perpendicular to the mechanical link between the paired coils; and it will be uniform in amplitude regardless of the angular position of the mechanical link (within the required angular motion of the actuator). In general, the angular position of the mechanical link is measured relative to some given registration line or plane developed at the disk drive body. Permanent magnet configurations can be designed which have the above properties by calculating the coil portion (which is the active wire length, l) to be subtended by the permanent magnet edges at some feasible (usually centermost) angular position of the mechanical link, and iteratively calculating the required permanent magnet edge position as the mechanical link is rotated about its mid-point pivot. The locii of the permanent magnet outermost edge positions form the required magnet shape at the outermost region. Space between magnets of differing polarity has the most effect on force amplitude versus link angle position, and the combination is required to obtain the sum of the force amplitude and force direction at each coil position relative to the permanent magnet field.

The centermost angular position of the mechanical link may exhibit a torque of more amplitude than the torque at either end of travel. Such excessive torque (force at the coil center) may be attenuated by adding a slot in both magnets as illustrated by the magnet components 266a, 266a', and 266b, 266b' in combination with magnet components 268a, 268a' and 268b, 268b' illustrated in FIGS. 26A-26C. The lack of permanent magnet field in the slot between the noted magnet components reduces the force, and therefore the torque, when the coil wire is over such slot. Since the force is a summation (the coil is integrating the force developed) the change in force as the coil wire passes over such slot region is gradual. By incorporating such magnet spacing, the torque may be made uniform within about 10% as the mechanical link angle of displacement changes as illustrated in the figures as they progress from FIG. 26A through FIG. 26C. By careful design, the torque uniformity may be further improved as disclosed in the figures to follow.

It may be noted that the torque at the ends of travel of the coils consists of the vector sum of the force vector developed at one end, for example the upper end of the mechanical link and the force vector developed at the other, lower end. These two ends relate to differently configured permanent magnet fields. In general, for the example of FIGS. 26A-26C, the permanent magnet field is symmetrical about a line through the centermost position of the head-arm assembly and also symmetrical about a line through the mid-point of the mechanical link and perpendicular to the first line.

To obtain the value of the pure torque developed by any combination of permanent magnet and coil configuration, the force vectors at each end of the mechanical link should be resolved into vectors through the ends of the mechanical link and perpendicular to that link. If those two summed force vectors are not equal in amplitude, the lesser of the two values is used to calculate the pure torque and the difference between the greater and lesser amplitude values is considered to be an unbalanced force acting through the end of the link.

The design of the instant system becomes more complex when the pivot position is not at the center of the mechanical link as set forth, for example, in the embodiment of FIGS. 18-20 and schematically represented in conjunction with FIGS. 27A-27C. Most disk drives are so constrained in physical layout that the actuator pivot cannot be at the mid-point of the mechanical link. The proximity of the actuator permanent magnet field to the data storage disk also precludes a pivot at the mechanical link mid-point. In addition, the actuator system should be in static balance with the head and head support structure to assure a least deflection of head position with imposition of externally applied lateral forces on the drive. The coils and coil support structure should, therefore, be positioned away from the actuator pivot by a distance which, when multiplied by the mass of the coils plus coil support will equal the head mass and head support structure mass multiplied by the distance from the pivot to their common center of gravity.

The pivot position does not affect the torque developed by a pure torque actuator. If unbalanced forces are developed, such force vectors will sum to create torque with a torque arm equal to the perpendicular distance to the actuator pivot and may sum to cause forces to be applied to the pivot bearing shaft. In practice, such forces probably will be created, but with careful design they may be kept small in comparison with the forces producing pure torque. In addition, careful design can limit such unbalanced forces to be predominantly along the axis of a head-arm assembly and, therefore, not acting to displace the head from the track, the head is intended to follow. Inspection of FIGS. 27A-27C shows a displaced pivot at location 270 and an operation in conjunction with the regularly geometrically positioned magnet components 272a, 272b, and 274a, 274b. The forces produced can be seen to be of unequal amplitude as represented by the vector arrows shown in those figures and in directions not necessarily perpendicular to the mechanical link between coil centers. This is because different parts of the permanent magnet field are intercepted by the coil portions at either end of the mechanical link. The result of the arrangement is a pure torque plus some unbalanced forces.

Moving the permanent magnet so that the permanent magnet field will agree with the new coil positions as the mechanical link pivots about this new pivot 270 may result, for example, in the magnet geometry shown in connection with FIGS. 28A-28C. Here, the magnet components 276a and 276b are seen to be relatively displaced as are the mirror image located magnet components 278a and 278b. This offset arrangement improves the desired force amplitude and direction, but still exhibits some unbalanced forces in all three positions shown from FIGS. 28A-28C. In FIG. 28B, the center position, note that there is an unbalanced force toward the top of the figure which forms a small side force on the pivot bearing and, therefore, the pivot shaft as well. For this case, the unbalanced force produces a small torque in the clockwise direction, summing as an addition to the clockwise torque produced by the pure torque couple.

A further improvement is obtained with empirically added permanent magnet field as represented in FIGS. 29A-29C. Note that the magnet components 280a, 280b, and 282a, 282b, commence to resemble the magnet structures of FIGS. 19 and 20. The resulting force amplitude and direction can be calculated for any empirical permanent magnet and coil configuration by following the steps enumerated above for each layer of winding in each region of the permanent magnet field.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Rotary positioning apparatus comprising;

an actuator body having a given mass characteristic, first and second longitudinally spaced apart end portions, and a center of gravity;

a pivot member for rotatably supporting said actuator body at a location between said first and second end portions;

couple means for applying a torque to said actuator body at a location remote from said pivot member, said torque being applied without substantial reaction forces on said pivot member by the application of torque defining, oppositely directed and spaced apart forces thereto generated by current i, within a coil of active length, l, and a magnetic field of value, B, under the relationship; $F=Bl$, to effect a predetermined pivotal movement of said actuator body about said pivot member.

2. The positioning apparatus of claim 1 in which said pivot member is located substantially at said center of gravity.

3. The positioning apparatus of claim 1 in which said couple means is configured as a fixed said coil and a permanent magnet assembly connected to and movable with said actuator body first end portion to form said magnetic field across said coil.

4. Rotary positioning apparatus comprising:

an actuator body having a given mass characteristic first and second longitudinally spaced apart end portions, and a center of gravity;

a pivot member for rotatably supporting an actuator body at a location between said first and second end portions;

couple means for applying a torque to said actuator body at a location remote from said pivot member, said torque being applied by the application of torque defining, opposite and spaced apart forces thereto generated by current, i, within a coil of active length, l, and a magnetic field of value, B, under the relationship: $F=BLi$, to effect a predetermined pivotal movement of said actuator body about said pivot member, said couple means being configured as two said coils fixed to and movable with said actuator body first end portion and a fixed permanent magnet assembly positioned to form said magnetic field across said coils.

5. The positioning apparatus of claim 4 in which said permanent magnet assembly is configured as sequentially disposed segments of spaced, edge defining permanent magnets of select magnetic polarity configured to derive predetermined values for said forces, F, in conjunction with the driven movement of said actuator body about said pivot.

6. The positioning apparatus of claim 5 in which said permanent magnet segments are configured as trapezoids.

7. The positioning apparatus of claim 5 in which said coils are wound with the configuration of an irregular geometric planar shape.

8. Rotary positioning apparatus comprising:

an actuator body having a given mass characteristic, first and second spaced apart end portions, and a center of gravity;

a pivot member for rotatably supporting said acutator body at a location between said first and second end portions;

a couple assembly for applying a torque to said actuator body at a location remote from said pivot member, said torque being applied by the application of torque defining, opposite and spaced apart forces thereto generated by current, i, within a coil of active length, 1, and a magnetic field of value, B, under the relationship: $F=Bli$, to effect a predetermined pivotal movement of said actuator body about said pivot member, said couple assembly comprising:

a first elongate permanent magnet of length between its first and second pole ends selected to derive a torque arm corresponding in dimension with said force spacing, fixed to and movable with said actuator body first end portion;

second and third permanent magnets mounted upon said first end portion at opposite sides of said first permanent magnet, spaced therefrom and having third and fourth pole ends coextensive therewith, to establish magnetic fields intermediate said first and third pole ends and second and fourth pole ends; and said coil being fixed in position and including windings of said active length, 1, located intermediate said first and second and first and third permanent magnets.

9. The positioning apparatus of claim 8 in which said first permanent magnet first and second pole ends are formed having ferrous caps for field flux concentration.

10. The positioning apparatus of claim 8 in which:

said first permanent magnet is formed of an aluminum-nickel-cobalt alloy and said first and second pole ends are formed having caps of rare earth magnetic material; and said second and third permanent magnets are rare earth magnets.

11. The positioning apparatus of claim 8 in which:

said first permanent magnet is formed of an alumina-nickel-cobalt alloy; and said second and third permanent magnets are formed of an aluminum-nickel-cobalt alloy and said third and fourth pole ends are formed as rare earth magnet caps.

12. The positioning apparatus of claim 8 in which:

said first, second and third permanent magnets are mutually aligned parallel with a common longitudinal axis; and each said first, second, third and fourth pole ends is configured having a transversely disposed end cap of transverse extent selected to provide substantially constant magnetic field interaction with said coil throughout said actuator body pivotal movement.

13. A rotary actuator for positioning a head at select locations adjacent a surface of a memory disk comprising:

an arm member of given mass having a first end portion for supporting said head, an oppositely disposed second end portion and a center of gravity location disposed therebetween;

a pivot member positioned adjacent said disk and rotatably supporting said arm member intermediate said first and second end portions;

first and second coils mounted upon said arm member second end portion remotely from said pivot member, representing with said head a portion of said mass, spaced apart a distance for deriving opposite, spaced forces forming a torque and energizable to carry current generating electromagnetic fields; and first and second permanent magnet assemblies, fixed with respect to said coils and located in spaced adjacency therewith for establishing magnetic fields reactive with said electromagnetic fields generated by said first and second current carrying coils to develop said spaced, oppositely directed, forces which sum to derive substantially pure torque at said first and second coils.

14. The rotary actuator of claim 13 in which said pivot member is positioned substantially at said center of gravity location.

15. The rotary actuator of claim 13 in which said magnet segments are configured having an irregular geometric shape.

16. A rotary actuator for positioning a head at select locations adjacent a surface of a memory disk comprising:

an arm member of given mass having a first end portion for supporting said head, an oppositely disposed second end portion and a center of gravity location disposed therebetween;

a pivot member positioned adjacent said disk and rotatably supporting said arm member intermediate said first and second end portions;

first and second coils mounted upon said arm member second end portion, representing with said head a portion of said mass, spaced apart a distance for deriving opposite, spaced forces forming a torque and energizable to carry current generating electromagnetic fields;

first and second permanent magnet assemblies, fixed with respect to said coils and located in spaced adjacency therewith for establishing magnetic fields reactive with said electromagnetic fields generated by said first and second current carrying coils to develop said oppositely directed, torque defining forces at said first and second coils, each said first and second permanent magnet assemblies comprising at least two spaced apart magnet segments of opposite polarity configured to substantially linearize the said defined torque derived at said first and second coils along the locus of pivotal movement of said arm member.

17. The rotary actuator of claim 16 in which each said first and second magnet assembly is comprised of magnets shaped as a trapezium, a notched rectangle, and a trapezoid.

18. The rotary actuator of claim 16 in which at least one of said magnet segments is configured as a trapezium.

19. A rotary actuator for positioning a head at select locations adjacent a surface of a memory disk comprising:

an arm member of given mass having a first end portion for supporting said head, an oppositely disposed second end portion and a center of gravity location disposed therebetween;

a pivot member positioned adjacent said disk and rotatably supporting said arm member intermediate said first and second end portions;

first and second coils mounted upon said arm member second end portion, representing with said head a portion of said mass, spaced apart a distance for deriving opposite, spaced forces forming a torque and energizable to carry current generating electromagnetic fields; and first and second permanent magnet assemblies, fixed with respect to said coils and located in spaced adjacency therewith for establishing magnetic fields reactive with said electromagnetic field generated by said first and second current carrying coils to develop said oppositely directed, torque defining forces at said first and second coils, said first and second permanent magnet assemblies each comprising at least one permanent magnet having regions of predetermined field strength selected to derive a substantially linear relationship of said oppositely directed forces with respect to the rotational position of said arm member.

20. A rotary actuator for positioning a head at select locations adjacent the surface of a memory disk, comprising:

an arm member of given mass having a first end portion for supporting said head and an oppositely disposed second end portion spaced therefrom;

a pivot member positioned adjacent said disk and rotatably supporting said arm member, disposed intermediate said first and second end portions;

a permanent magnet assembly mounted upon said arm member second end portion, representing with said head a portion of said mass, including a first permanent magnet having a torque moment defining dimension extending along a longitudinal axis between first and second magnet poles to effect pivotal movement of said arm member about said pivot member without applying substantial reaction forces thereon;

a coil assembly, fixed with respect to said arm member and having windings positioned to intercept magnetic flux emanating from said first permanent magnet for carrying current developing oppositely directed, torque defining forces substantially at said first and second magnet poles.

21. The rotary actuator of claim 20 in which said permanent magnet assembly includes;

second and third permanent magnets spaced respectively from opposite sides of said first permanent magnet and deriving a magnetic flux transfer path extending transversely to said axis at each said first and second magnetic poles, said second and third permanent magnets having longitudinal axes aligned with said first permanent magnet longitudinal axis.

22. The rotary actuator of claim 20 in which said pivot member is positioned substantially at said center of gravity location.

23. An actuator assembly comprising:

an arm member of given mass having a first end portion, an oppositely disposed second end portion spaced from said first end portion, and a center of gravity location disposed therebetween;

a pivot member rotatably supporting said arm member at a location between said first and second end portions;

a couple assembly located adjacent said arm member second end portion remote from said pivot member and having a first field component deriving a first magnetic field and fixed to said arm member in drive relationship for effecting the movement of said arm member about said pivot member, a second field component deriving a second magnetic field reactive with said first magnetic field to apply moments to said arm member which sum to derive substantially pure torque, one of said first and second field components comprising a coil carrying a reversible current.

24. The actuator assembly of claim 23 in which said pivot member is positioned substantially at said center of gravity location.

* * * * *